US007885362B2

(12) United States Patent
Wang

(10) Patent No.: US 7,885,362 B2
(45) Date of Patent: Feb. 8, 2011

(54) DATA TRANSMISSION SYSTEM AND METHOD THEREOF

(75) Inventor: Hui-Min Wang, Sinshih Township, Tainan County (TW)

(73) Assignee: Himax Technologies Limited, Tainan County (TW)

( * ) Notice: Subject to any disclaimer, the term of this patent is extended or adjusted under 35 U.S.C. 154(b) by 651 days.

(21) Appl. No.: 11/907,859

(22) Filed: Oct. 18, 2007

(65) Prior Publication Data

US 2009/0103674 A1 Apr. 23, 2009

(51) Int. Cl.
*H04L 27/00* (2006.01)

(52) U.S. Cl. ....................................... 375/326; 375/354

(58) Field of Classification Search ................. 375/327, 375/354, 326

See application file for complete search history.

(56) References Cited

U.S. PATENT DOCUMENTS

2003/0056036 A1* 3/2003 Carlton ........................ 710/15
2005/0147178 A1* 7/2005 Kikuchi ...................... 375/288
2007/0164883 A1* 7/2007 Furtner ....................... 341/126
2007/0237243 A1* 10/2007 Fagan ......................... 375/257

* cited by examiner

*Primary Examiner*—Chieh M. Fan
*Assistant Examiner*—Freshteh N Aghdam
(74) *Attorney, Agent, or Firm*—Rabin & Berdo, P.C.

(57) ABSTRACT

A data transmission system includes a transmitter and a receiver. The transmitter mixes an original clock signal and an original data signal to generate and output a hybrid differential signal, the hybrid differential signal having multiple clock pulses and multiple data pulses. At lease one data pulse occurs between two clock pulses, and the period between two clock pulses corresponds to the frequency of the original clock signal. The clock pulses and the data pulses have different differential swings. The receiver receives the hybrid differential signal via a bus and generates a recovered clock signal and a recovered data signal based on the hybrid differential signal. The hybrid differential signal, the original clock signal and the original data signal are reduced swing differential signals.

16 Claims, 5 Drawing Sheets

DATA TRANSMISSION SYSTEM AND METHOD THEREOF

BACKGROUND OF THE INVENTION

1. Field of the Invention

The invention relates in general to a data transmission system and method thereof, and more particularly to a data transmission system capable of increasing data transmission rate and method thereof.

2. Description of the Related Art

The reduced swing differential signal (RSDS) is often used for data transmission in a panel system of a liquid crystal display. Referring to FIG. 1, a block diagram of a conventional data transmission system of a liquid crystal display is shown. The data transmission system 100 includes a timing controller 110 and many drivers 121 to 12N, wherein N is a positive integer. The timing controller 110 transmits a data signal Data in cooperation with a clock signal CLK to the drivers 121 to 12N via a transmission bus. The clock signal CLK 1 is a synchronized clock signal.

The different impedance between each of the drivers 121 to 12N and the timing controller 110 will result in the skew of the data signal Data and the clock signal CLK. Hence, it will cause the difficulty in the design of the data transmission system and the bottleneck in data transmission rate. And this is a significant issue to the high-quality and large-sized TV.

SUMMARY OF THE INVENTION

The invention is directed to a data transmission system and method thereof. The data signal and the clock signal are mixed and then transmitted to a corresponding driver via an independent transmission bus, such that the problem of the skew between the data signal and the clock signal is resolved. Thus, the length of the transmission bus may be prolonged, and data transmission rate is increased.

According to a first aspect of the present invention, a data transmission system is provided. The data transmission system includes a transmitter and a receiver. The transmitter mixes an original clock signal and an original data signal to generate and output a hybrid differential signal, the hybrid differential signal having multiple clock pulses and multiple data pulses. At lease one data pulse occurs between two clock pulses, and the period between two clock pulses corresponds to the frequency of the original clock signal. The clock pulses and the data pulses have different differential swings. The receiver receives the hybrid differential signal via a bus and generates a recovered clock signal and a recovered data signal based on the hybrid differential signal. The hybrid differential signal, the original clock signal and the original data signal are reduced swing differential signals.

According to a second aspect of the present invention, a data transmission method applied in a data transmission system is provided. The data transmission system includes a transmitter and a receiver. The method includes the following steps. First, an original clock signal and an original data signal are mixed to generate a hybrid differential signal by the transmitter. The hybrid differential signal has multiple clock pulses and multiple data pulses, wherein at lease one data pulse occurs between two clock pulses, and the period between two clock pulses corresponds to the frequency of the original clock signal. The clock pulses and the data pulses have different differential swings. Next, the hybrid differential signal is received via a bus by the receiver. Afterwards, a recovered clock signal and a recovered data signal are generated based on the hybrid differential signal by the receiver. The hybrid differential signal, the original clock signal and the original data signal are reduced swing differential signals.

According to a third aspect of the present invention, a data transmission system of a liquid-crystal display system is provided. The data transmission system includes a timing controller and multiple drivers. The timing controller outputs a plurality of hybrid differential signals each corresponding to an original clock signal and an original data signal. The drivers each receives the corresponding hybrid differential signal and converts the hybrid differential signal into a recovered clock signal and a recovered data signal. The timing controller transmits each hybrid differential signal to the corresponding driver via an independent transmission bus.

The invention will become apparent from the following detailed description of the preferred but non-limiting embodiments. The following description is made with reference to the accompanying drawings.

DETAILED DESCRIPTION OF THE INVENTION

The invention provides a data transmission system and method thereof. The data signal and the clock signal are mixed to generate a hybrid differential signal (HDS). Then the hybrid differential signal is transmitted to a corresponding driver via an independent transmission bus, such that the problem of the skew between the data signal and the clock signal is resolved. Thus, the length of the transmission bus may be prolonged, and data transmission rate is increased.

Figure 1:
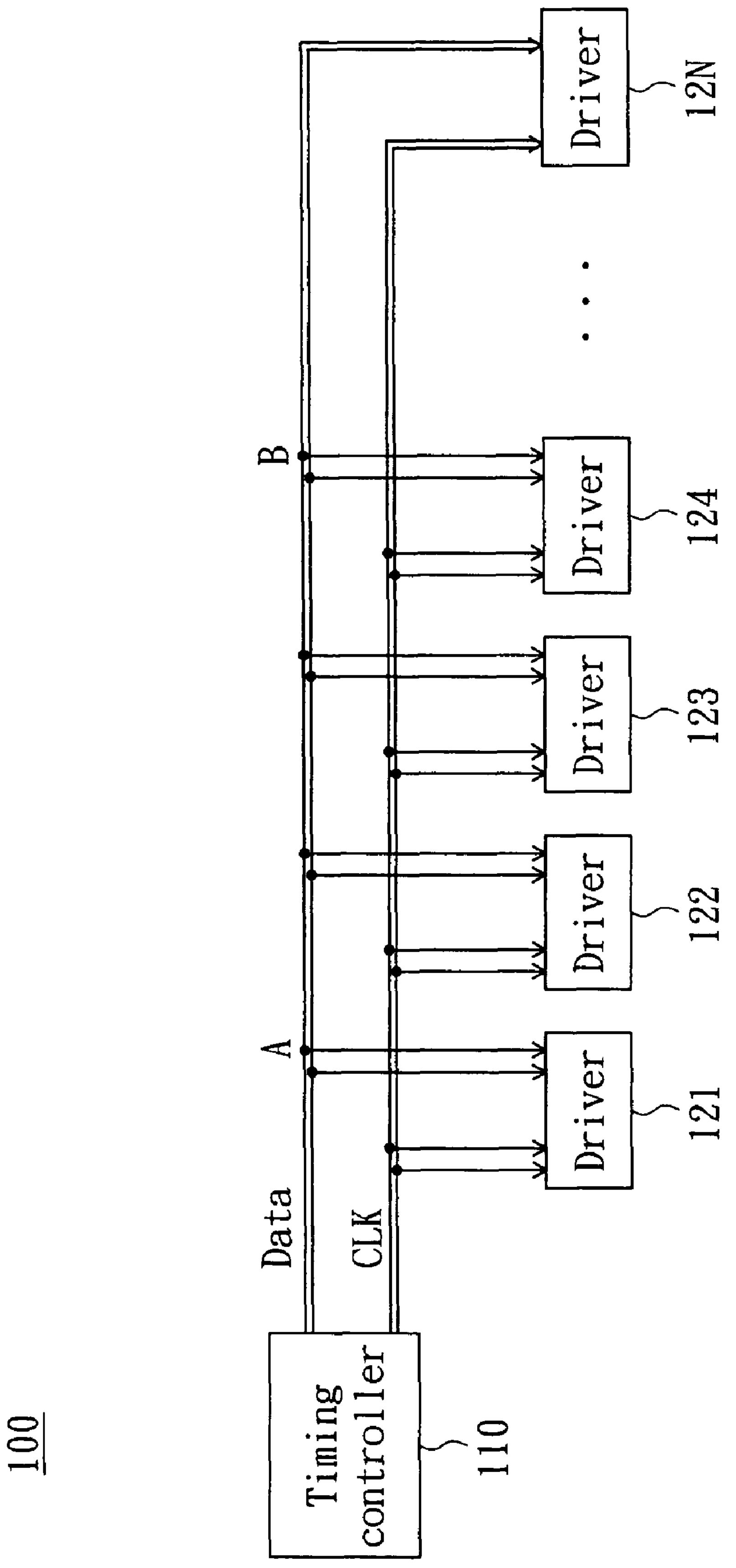
FIG. 1(PRIOR ART)
FIG. 1 is a block diagram of a conventional data transmission system of a liquid crystal display.
Figure 2:
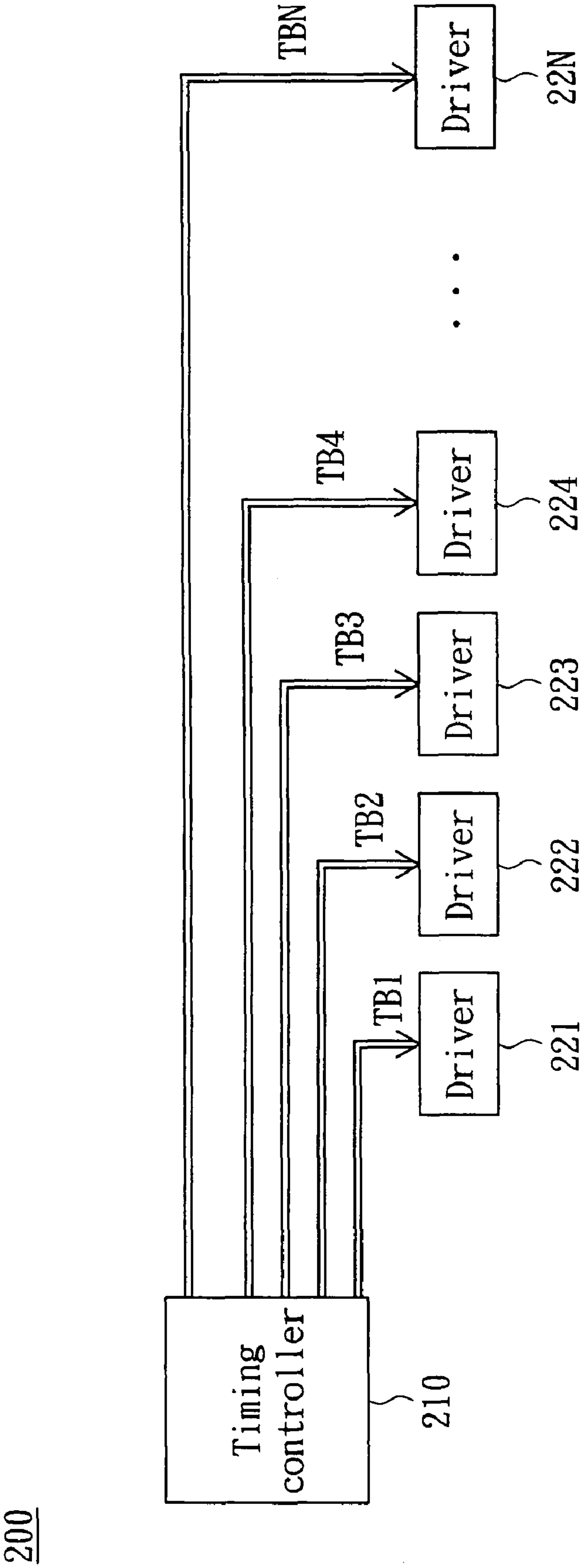
FIG. 2 is an illustration of a data transmission system of a liquid-crystal display system in accordance with an embodiment of the invention.

Referring to FIG. 2, an illustration of a data transmission system of a liquid-crystal display system in accordance with an embodiment of the invention is shown. The data transmission system 200, disposed in a liquid-crystal display system, includes a timing controller 210 and N drivers 221 to 22N, and N is a positive integer. Each of the drivers 221 to 22N is coupled to the timing controller 210 via an independent transmission bus (TB1 to TBN). The transmission buses TB1 to TBN are differential signal buses. Take the timing controller 210 and the driver 221 as exemplified hereinafter, but it is not limited thereto and may be applied to other drivers related to the timing controller 210.

Figure 3:
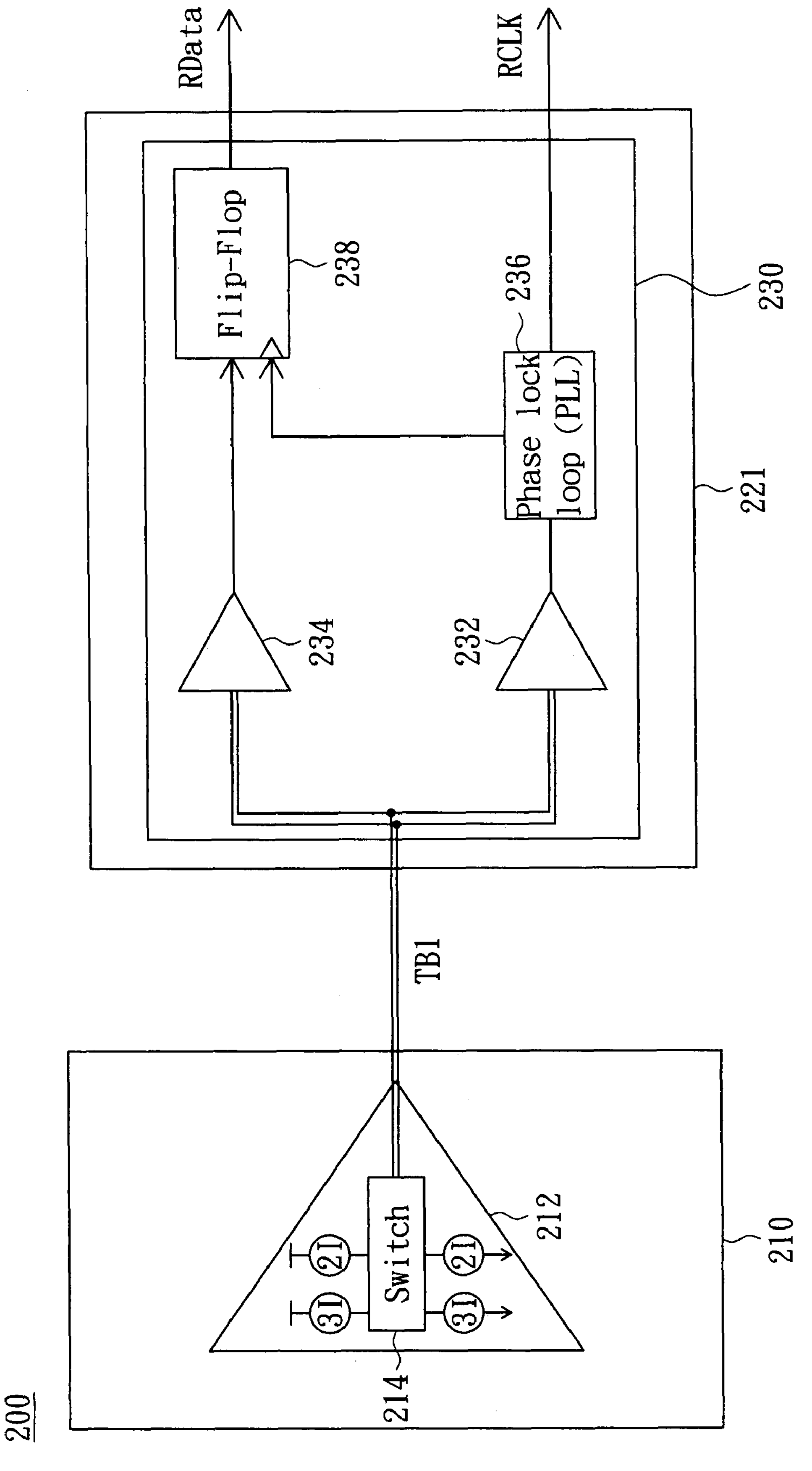
FIG. 3 is a block diagram of the data transmission system 200 in accordance with the embodiment of the invention.
Figure 4:
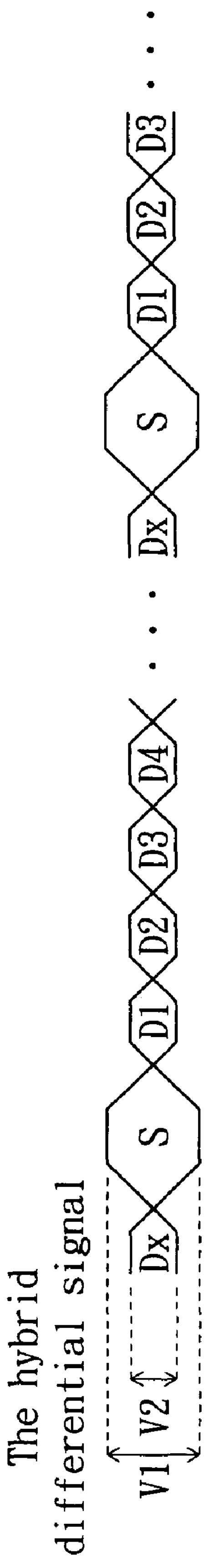
FIG. 4 is a schematic diagram of a hybrid differential signal in accordance with an embodiment of the invention.

Referring to FIG. 3, a block diagram of the data transmission system 200 in accordance with the embodiment of the invention is shown. In the data transmission system 200, the timing controller 210 includes a transmitter 212 and the driver 221 includes a receiver 230. The transmitter 212 mixes an original clock signal and an original data signal to generate and output a hybrid differential signal. The hybrid differential signal, the original clock signal and the original data signal are reduced swing differential signals (RSDS). Referring to FIG. 4, a schematic diagram of a hybrid differential signal in accordance with an embodiment of the invention is shown. The hybrid differential signal has multiple clock pulses (S) and multiple data pulses (D1 to Dx). At lease one data pulse occurs between two clock pulses, and the period between two clock pulses corresponds to the frequency of the original clock signal. The clock pulses (S) substantially correspond to the original clock signal while the data pulses (D1 to Dx) substantially correspond to the original data pulses.

The clock pulses (S) and the data pulses (D1 to Dx) have different differential swings. The voltage amplitude V1 of the clock pulses (S) is larger than the voltage amplitude V2 of the data pulses (D1 to Dx), but it is not limited to the above exemplification. In practical application, as long as the voltage amplitude V1 of the clock pulses (S) is different from the voltage amplitude V2 of the data pulses (D1 to Dx) will do. In FIG. 3, the transmitter 212 employs a switch 214, different power sources, and the impedance of the independent transmission bus TB1, such that the voltage amplitude V1 of the clock pulses (S) is different from the voltage amplitude V2 of the data pulses (D1 to Dx).

In the data transmission system 200, the receiver 230 receives the hybrid differential signal via an independent transmission bus and generates a recovered clock signal and a recovered data signal based on the different voltage amplitudes of the clock pulses (S) and the data pulses (D1 to Dx) of the hybrid differential signal. The recovered clock signal is substantially equal to the original clock signal while the recovered data signal is substantially equal to the original data signal. The receiver 230 includes a first differential-to-signal amplifier 232, a second differential-to-signal amplifier 234, a phase lock loop (PLL) 236 and a flip-flop 238. The first differential-to-signal amplifier 232 has a first hysteresis voltage and generates a first signal based on the hybrid differential signal according to the first hysteresis voltage. The first hysteresis voltage ranges between the voltage amplitude of the clock pulses (S) and the voltage amplitude of the data pulses (D1 to Dx).

The second differential-to-signal amplifier 234 has a second hysteresis voltage. The second differential-to-signal amplifier 234 receives the hybrid differential signal and transmits a second signal. The second hysteresis voltage is substantially equal to 0. In the present embodiment of the invention, the first hysteresis voltage and the second hysteresis voltage are respectively determined according to the voltage amplitude of the clock pulses (S) and the voltage amplitude of the data pulses (D1 to Dx) of the hybrid differential signal in FIG. 3. If the voltage amplitude of the clock pulses (S) and the voltage amplitude of the data pulses (D1 to Dx) change, the first hysteresis voltage and the second hysteresis voltage will change correspondingly so as to differentiate the clock pulses (S) from the data pulses (D1 to Dx).

The phase lock loop 236 multiplies the frequency of the first signal by a positive integer to generate and output the recovered clock signal RCLK. The flip-flop 238 is coupled to the second differential-to-signal amplifier 234 and the phase lock loop 236, and generates and outputs the recovered data signal RData based on the second signal under the control of the recovered clock signal RCLK.

In the data transmission system 200, as each hybrid differential signal is respectively transmitted to the corresponding driver via an independent transmission bus, there is no need to consider impedance matching problems, and the length of the transmission bus can thus be prolonged.

Figure 5:
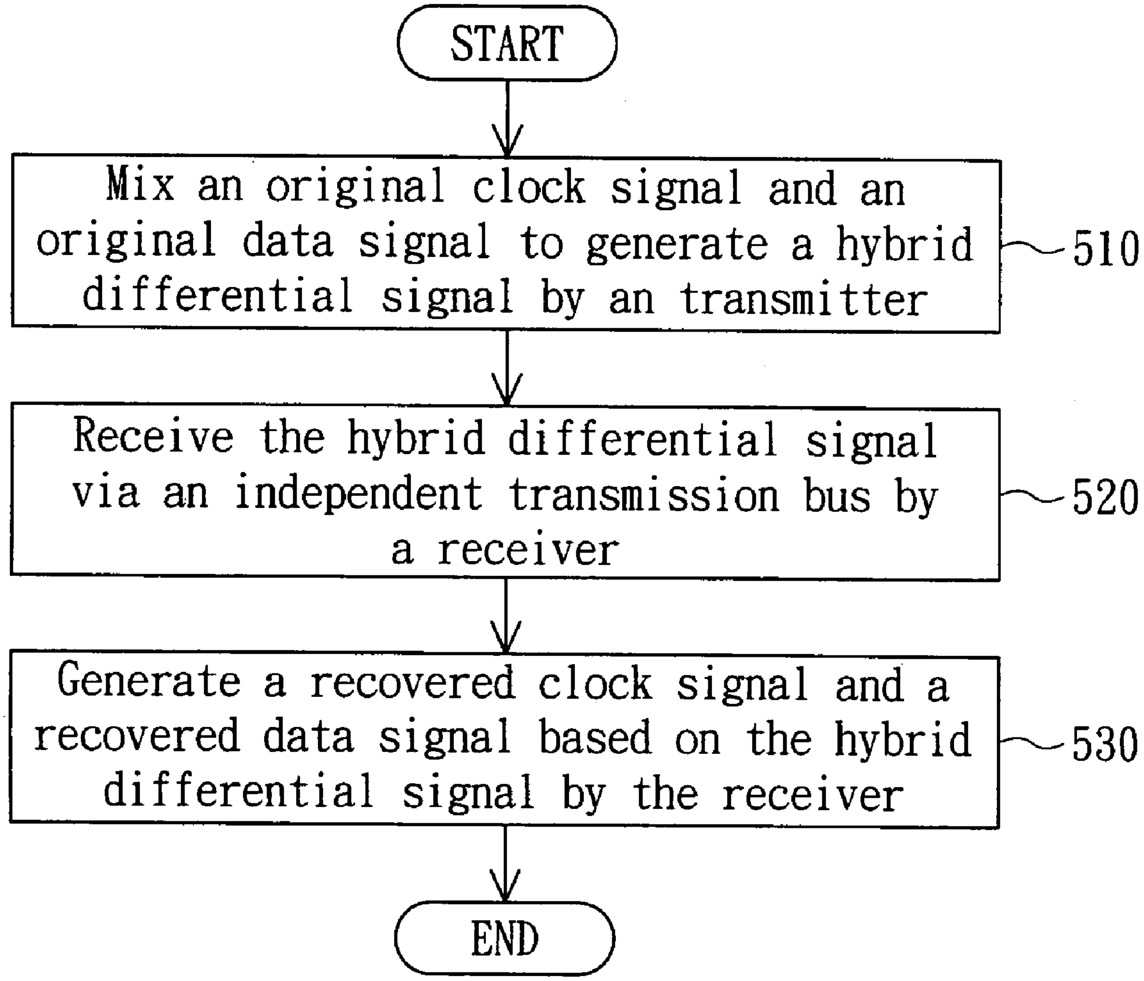
FIG. 5 is a flow chart of a data transmission method in accordance with an embodiment of the invention.

Referring to FIG. 5, a flowchart of a data transmission method in accordance with an embodiment of the invention is shown. The data transmission method disclosed in the present embodiment of the invention is applied in the data transmission system 200 mentioned hereinabove. The data transmission method includes the following steps. First, in the step 510, an original clock signal and an original data signal are mixed to generate a hybrid differential signal by the transmitter. The hybrid differential signal has multiple clock pulses and multiple data pulses. At lease one data pulse occurs between two clock pulses, and the period between two clock pulses corresponds to the frequency of the original clock signal. The clock pulses and the data pulses have different differential swings.

Next, in the step 520, the hybrid differential signal is received via an independent transmission bus by the receiver. Then, in the step 530, a recovered clock signal and a recovered data signal are generated based on the different voltage amplitudes of the clock pulses (S) and the data pulses (D1 to Dx) of the hybrid differential signal by the receiver. The hybrid differential signal, the original clock signal and the original data signal are reduced swing differential signals.

According to the data transmission system and method thereof disclosed in the above embodiments of the invention, the original clock signal and the original data signal are mixed to generate a hybrid differential signal by different differential swings, and then the hybrid differential signal is transmitted to a corresponding driver via an independent transmission bus. Thus, the problem of the skew between the original clock signal and the original data signal is resolved by the hybrid differential signal, and therefore the maximum data transmission rate can be further increased. Furthermore, as the original clock signal and the original data signal are synchronized, the data transmission rate can be dynamically adjusted to match user's needs. Besides, there is no need to consider impedance matching problems for the independent transmission bus, and the length of the transmission bus can thus be prolonged.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A data transmission system, comprising:

a transmitter for mixing an original clock signal and an original data signal to generate and output a hybrid differential signal, the hybrid differential signal having a plurality of clock pulses and a plurality of data pulses, wherein at lease one data pulse occurs between two clock pulses, and the period between two clock pulses corresponds to the frequency of the original clock signal, the transmitter comprising:

two sets of current sources; and a switch circuit, coupled to the two sets of the current sources, for outputting a first current from one of the two sets of the current sources when the transmitter outputs the clock pulses, and for outputting a second current from the other of the two sets of the current sources when the transmitter outputs the data pulses, the first current and the second current having different current magnitude, so that the clock pulses and the data pulses having different differential swings; and a receiver for receiving the hybrid differential signal via a bus and generating a recovered clock signal and a recovered data signal based on the hybrid differential signal;

wherein the hybrid differential signal, the original clock signal and the original data signal are reduced swing differential signals.

2. The data transmission system according to claim 1, wherein the original clock signal and the original data signal are mixed by the transmitter in a timing controller, and the hybrid differential signal is received by the receiver in a driver.

3. The data transmission system according to claim 1, wherein the receiver comprises:

a first differential-to-single amplifier having a first hysteresis voltage, wherein the first differential-to-single amplifier generates a first signal based on the hybrid differential signal according to the first hysteresis voltage, and the first hysteresis voltage is between the differential swing of the clock pulses and the differential swing of the data pulses;

a second differential-to-single amplifier having a second hysteresis voltage, wherein the second differential-to-single amplifier receives the hybrid differential signal and outputs a second signal, and the second hysteresis voltage substantially is equal to 0;

a phase lock loop used for multiplying the frequency of the first signal by an positive integer to generate the recovered clock signal; and a flip-flop coupled to the second differential-to-single amplifier and the phase lock loop, and generating the recovered data signal based on the second signal under the control of the recovered clock signal.

4. The data transmission system according to claim 1, wherein the differential swings of the clock pulses are larger than the differential swings of the data pulses.

5. A data transmission method applied in a data transmission system, the data transmission system comprising a transmitter and a receiver, the method comprising:

mixing an original clock signal and an original data signal to generate a hybrid differential signal by the transmitter, the hybrid differential signal having a plurality of clock pulses and a plurality of data pulses, wherein at lease one data pulse occurs between two clock pulses, the period between two clock pulses corresponds to the frequency of the original clock signal, and the clock pulses and the data pulses having different differential swings;

receiving the hybrid differential signal via a bus by the receiver; and generating a recovered clock signal and a recovered data signal based on the hybrid differential signal by the receiver;

wherein the hybrid differential signal, the original clock signal and the original data signal are reduced swing differential signals.

6. The data transmission method according to claim 5, wherein the original clock signal and the original data signal are mixed by the transmitter in a timing controller, and the hybrid differential signal is received by the receiver in a driver.

7. The data transmission method according to claim 5, wherein the differential swings of the clock pulses are larger than the differential swings of the data pulses.

8. A data transmission system of a liquid-crystal display system, comprising:

a timing controller for outputting a plurality of hybrid differential signals each corresponding to an original clock signal and an original data signal, each of the hybrid differential signals having a plurality of clock pulses and a plurality of data pulses, wherein at least one data pulse occurs between two clock pulses, and the period between two clock pulses corresponds to the frequency of the original clock signal, the timing controller comprising at least one transmitter, the transmitter including:

two sets of current sources; and a switch circuit, coupled to the two sets of the current sources, for outputting a first current from one of the two sets of the current sources when the transmitter outputs the clock pulses, and for outputting a second current from the other of the two sets of the current sources when the transmitter outputs the data pulses, the first current and the second current having different current magnitude, so that the clock pulses and the data pulses having different differential swings; and a plurality of drivers each receiving the corresponding hybrid differential signal and converting the hybrid differential signal into a recovered clock signal and a recovered data signal;

wherein the timing controller transmits each hybrid differential signal to the corresponding driver via an independent transmission bus.

9. The system according to claim 8, wherein the differential swings of the clock pulses are larger than the differential swings of the data pulses.

10. The system according to claim 8, wherein each of the drivers comprises a receiver for receiving the corresponding hybrid differential signal and converting the corresponding hybrid differential signal into the recovered clock signal and the recovered data signal.

11. The system according to claim 10, wherein the receiver in each of the drivers converts the corresponding hybrid differential signal into the recovered clock signal and the recovered data signal according to the different differential swings between the clock pulses and the data pulses.

12. The system according to claim 8, wherein the independent transmission bus is a differential signal bus.

13. A data transmission system, comprising:

a transmitter for mixing an original clock signal and an original data signal to generate and output a hybrid differential signal, the hybrid differential signal having a plurality of clock pulses and a plurality of data pulses, wherein at least one data pulse occurs between two clock pulses, the period between two clock pulses corresponds to the frequency of the original clock signal, and the clock pulses and the data pulses having different differential swings; and a receiver for receiving the hybrid differential signal via a bus and generating a recovered clock signal and a recovered data signal based on the hybrid differential signal, the receiver comprising:

a first differential-to-single amplifier having a first hysteresis voltage, wherein the first differential-to-single amplifier generates a first signal based on the hybrid differential signal according to the first hysteresis voltage, and the first hysteresis voltage has a level that is between the differential swing of the clock pulses and the differential swing of the data pulses;

a second differential-to-single amplifier having a second hysteresis voltage, wherein the second differential-to-single amplifier receives the hybrid differential signal and outputs a second signal, and the second hysteresis voltage substantially is equal to 0;

a phase lock loop used for multiplying the frequency of the first signal by an positive integer to generate the recovered clock signal; and a flip-flop coupled to the second differential-to-single amplifier and the phase lock loop, and generating the recovered data signal based on the second signal under the control of the recovered clock signal;

wherein the hybrid differential signal, the original clock signal and the original data signal are reduced swing differential signals.

14. The data transmission system according to claim 13, wherein the original clock signal and the original data signal are mixed by the transmitter in a timing controller, and the hybrid differential signal is received by the receiver in a driver.

15. The data transmission system according to claim 13, wherein the transmitter comprises a switch circuit and two sets of current sources coupled to the switch circuit, the switch circuit outputting a first current from one of the two sets of the current sources when the transmitter outputs the clock pulses, and the switch circuit outputting a second current from the other of the two sets of the current sources when the transmitter outputs the data pulses, the first current and the second current having different current magnitudes, so that the clock pulses and the data pulses have different differential swings.

16. The data transmission system according to claim 13, wherein the differential swings of the clock pulses are larger than the differential swings of the data pulses.

* * * * *